United States Patent
Nadeau et al.

(10) Patent No.: US 10,931,863 B2
(45) Date of Patent: Feb. 23, 2021

(54) CAMERA CONTROL SYSTEM AND METHOD OF CONTROLLING A SET OF CAMERAS

(71) Applicant: Genetec Inc., St-Laurent (CA)

(72) Inventors: Yannick Nadeau, Montreal (CA); Simon Brassard, Laval (CA)

(73) Assignee: GENETEC INC., St-Laurent (CA)

( * ) Notice: Subject to any disclaimer, the term of this patent is extended or adjusted under 35 U.S.C. 154(b) by 0 days.

(21) Appl. No.: 16/130,460

(22) Filed: Sep. 13, 2018

(65) Prior Publication Data

US 2020/0092460 A1    Mar. 19, 2020

(51) Int. Cl.
*H04N 5/232* (2006.01)
*H04N 7/18* (2006.01)
*G08B 13/196* (2006.01)

(52) U.S. Cl.
CPC ... *H04N 5/23206* (2013.01); *G08B 13/19682* (2013.01); *G08B 13/19689* (2013.01); *H04N 5/23216* (2013.01); *H04N 5/23218* (2018.08); *H04N 5/23296* (2013.01); *H04N 5/23299* (2018.08); *H04N 5/232127* (2018.08); *H04N 5/232933* (2018.08); *H04N 5/232939* (2018.08);
(Continued)

(58) Field of Classification Search
CPC ......... H04N 5/23206; H04N 5/232127; H04N 5/23216; H04N 5/23293; H04N 5/232933; H04N 5/232939; H04N 5/232945; H04N 5/23296; H04N 5/23299; H04N 7/181; G08B 13/19682; G08B 13/19689
See application file for complete search history.

(56) References Cited

U.S. PATENT DOCUMENTS 6,437,819 B1   8/2002   Loveland
6,608,649 B2   8/2003   Suzuki et al.
(Continued)

FOREIGN PATENT DOCUMENTS

CN    102447880 A    5/2012
KR    10-0907423 B1    7/2009
(Continued)

OTHER PUBLICATIONS http://www.puretechsystems.com/videos/map-based-camera-control.html.

(Continued)

*Primary Examiner* — Daniel M Pasiewicz
(74) *Attorney, Agent, or Firm* — Anglehart et al.

(57) ABSTRACT

A method of controlling cameras from a set of cameras in a geographical region to obtain image streams capturing a topographical area of interest. It includes receiving an area data object defining the topographical area of interest; deriving a centroid of the topographical area of interest from the area data object; determining a subset of target cameras from the set of cameras having a zone of potential coverage comprising the topographical area of interest; computing pan and tilt angles for one or more target cameras of the subset of target cameras; computing for one or more target cameras of the subset of target cameras a zoom factor, the zoom factor calculated by determining a narrowest field of view angle of the target camera that encompasses the entire topographical area of interest; and generating transmission commands for the subset of target cameras.

23 Claims, 12 Drawing Sheets

(52) U.S. Cl.
CPC ....... *H04N 5/232945* (2018.08); *H04N 7/181* (2013.01)

(56) References Cited

U.S. PATENT DOCUMENTS

| | | | | |
|---|---|---|---|---|
| 6,680,746 | B2* | 1/2004 | Kawai | H04N 5/232 348/14.07 |
| 6,888,565 | B1* | 5/2005 | Tanaka | G08B 13/19645 348/207.1 |
| 6,909,458 | B1 | 6/2005 | Suzuki et al. | |
| 7,321,453 | B2* | 1/2008 | Murata | H04N 5/232 348/14.07 |
| 7,522,745 | B2 | 4/2009 | Grasso et al. | |
| 7,701,488 | B2 | 4/2010 | Chen et al. | |
| 7,839,926 | B1* | 11/2010 | Metzger | H04N 5/144 375/240.01 |
| 8,085,298 | B2 | 12/2011 | Ishigami et al. | |
| 8,570,286 | B2* | 10/2013 | Laberge | G06F 3/0481 345/156 |
| 8,624,709 | B2 | 1/2014 | Estes et al. | |
| 8,638,371 | B2* | 1/2014 | Laberge | H04N 5/232 348/211.13 |
| 8,836,802 | B2* | 9/2014 | Laberge | H04N 5/23206 348/143 |
| 8,869,058 | B1* | 10/2014 | De | G06Q 10/10 715/771 |
| 9,544,489 | B2 | 1/2017 | Laforte et al. | |
| 9,615,064 | B2 | 4/2017 | Millar et al. | |
| 9,848,172 | B2 | 12/2017 | Deangelis et al. | |
| 2003/0202101 | A1* | 10/2003 | Monroe | G08B 13/19689 348/156 |
| 2006/0028548 | A1* | 2/2006 | Salivar | G08B 13/19643 348/143 |
| 2008/0211929 | A1 | 9/2008 | Uchihara | |
| 2010/0013917 | A1 | 1/2010 | Hanna et al. | |
| 2013/0128050 | A1 | 5/2013 | Aghdasi et al. | |
| 2014/0380163 | A1 | 12/2014 | Peng et al. | |
| 2017/0223314 | A1* | 8/2017 | Collings, III | H04W 4/90 |

FOREIGN PATENT DOCUMENTS

| | | |
|---|---|---|
| KR | 10-1071352 B1 | 10/2011 |
| KR | 10-1553460 B1 | 9/2015 |

OTHER PUBLICATIONS

PCT/CA2019/051301 international search report dated Jan. 13, 2020.
PCT/CA2019/051301 Search strategy dated Jan. 13, 2020.
PCT/CA2019/051301 written opinion dated Jan. 13, 2020.

* cited by examiner

CAMERA CONTROL SYSTEM AND METHOD OF CONTROLLING A SET OF CAMERAS

TECHNICAL FIELD

The present application relates to monitoring and surveillance, and more particularly to controlling a set of cameras such that they focus on an area of interest.

BACKGROUND

Security systems for certain sites may include a multitude of cameras. When one camera of the security system spots an object of interest, such as a car or person, it would be advantageous to have the other cameras of the security system capable of capturing the object of interest to do so. As such, the user of the security system can gather additional information on the object of interest, which may assist, for instance, in identifying the vehicle or the person.

Moreover, it would also be advantageous to have the cameras that can cover the object of interest also undergo the necessary zooming to focus on the object of interest.

Currently, once a user of a security system identifies the object of interest, the user has to manually redirect and zoom each of the cameras on the object of interest. This exercise is time consuming, and during the time taken to perform these actions, there is a risk that the object of interest will leave its current position before the user can have the other cameras focus on the object.

As such, it would be advantageous to have a camera system that can rapidly focus cameras that can cover an area on interest onto the area of interest with little or not human interview involved.

SUMMARY

The present disclosure relates to a method of controlling a set of cameras such that the cameras' parameters (tilt and pan; zoom) are adjusted, causing the cameras to focus on an area of interest. Therefore, the user of the camera system does not have to adjust each of the cameras' settings manually. Instead, once an area of interest is identified (e.g. where the user has identified, e.g., on an interface, an area of interest), commands are generated for each camera that can cover the area of interest to adjust the pan/tilt and zoom of the cameras such that the cameras focus on the area of interest.

The zoom of the cameras can be adjusted by calculating the narrowest field of view angle that covers the entire area of interest once the target camera is centered with respect to the centroid of the area of interest.

A broad aspect is a method of controlling cameras from a set of cameras in a geographical region to obtain image streams capturing a topographical area of interest. The method includes receiving an area data object defining the topographical area of interest comprising dimension parameters defining at least two dimensions of the topographical area of interest and position parameters defining a position for the topographical area of interest. The method includes deriving a centroid of the topographical area of interest from the area data object. The method includes determining a subset of target cameras from the set of cameras having a zone of potential coverage comprising the topographical area of interest. The method includes computing pan and tilt angles for one or more target cameras of the subset of target cameras such that a field of view of the one or more target cameras of the subset of target cameras is centered with respect to the centroid. The method includes computing for one or more target cameras of the subset of target cameras a zoom factor, the zoom factor calculated by determining a narrowest field of view angle of the target camera that encompasses the entire topographical area of interest as determined from the area data object. The method includes generating transmission commands for the subset of target cameras based on the computed zoom factor and the computed pan and tilt angles.

In some embodiments, the area data object may relate to a two-dimensional map.

In some embodiments, the receiving the area data object may include receiving a camera selection of the set of cameras; and generating the area data object of the two-dimensional area of interest from a field of view of a selected camera corresponding to the camera selection.

In some embodiments, the generating the area data object may include identifying an area or object of interest in the field of view of the selected camera; converting to map scale, wherein the object of interest is defined by a set of coordinates; and generating the area data object such that the two-dimensional area of interest covers the set of coordinates of the object of interest.

In some embodiments, the determining a subset of target cameras of the set of cameras may be further determined by an elevation parameter of the target camera.

In some embodiments, the determining a subset of target cameras of the set of cameras may further consider elevation parameters of buildings and walls that can affect a field of view of one or more cameras of the set of cameras.

In some embodiments, the calculating the zoom factor and the narrowest field of view angle may include computing a first outer edge of the field of view of the camera of the one or more target cameras that intersects with the two-dimensional area of interest at the broadest angle defined from the central axis of the field of view of the camera of the one or more target cameras.

In some embodiments, the computing the zoom factor of the camera may include computing a position of a first outer edge of a field of view object that contacts the two-dimensional area of interest based on the dimension information of the two-dimensional area of interest and the position parameters of the two-dimensional area of interest, computing a position of a second outer edge of the field of view object that contacts the two-dimensional area of interest based on the dimension information of the two-dimensional area of interest and the position parameters of the two-dimensional area of interest, determining the narrowest field of view angle from the position of the first outer edge and the position of the second outer edge, and calculating the zoom factor from the narrowest field of view angle.

In some embodiments, the computing the position of the first outer edge may include performing a rotation of the first outer edge of the field of view object at a maximum field of view angle of the target camera in a first direction and identifying the position of the first outer edge of the field of view object when the first outer edge contacts the two-dimensional area of interest, and wherein the computing the position of the second outer edge comprises performing a rotation of the second outer edge of the field of view object at a maximum field of view angle of the target camera in a second direction and identifying the position of the second outer edge of the field of view object when the second outer edge contacts the two-dimensional area of interest.

In some embodiments, the calculating the zoom factor of the target camera may be further computed from a maximum distance of the target camera and a maximum field of view angle of the target camera.

In some embodiments, the dimension parameters may define a two-dimensional area of interest with a polygonal shape, wherein the first outer edge of the field of view object may contact at least a first corner of the two-dimensional area of interest, and wherein the second outer edge of the field of view object may contact at least a second corner of the two-dimensional area of interest.

Another broad aspect is a computer device. The computer device includes a memory to store data and instructions, a processor in communication with the memory; and a computer-readable camera controlling application accessible via the memory and the processor. The camera controlling application is operable to receive an area data object defining the topographical area of interest comprising dimension parameters defining at least two dimensions of the topographical area of interest and position parameters defining a position for the topographical area of interest; derive a centroid of the topographical area of interest from the area data object; determine a subset of target cameras from the set of cameras having a zone of potential coverage comprising the topographical area of interest; compute pan and tilt angles for one or more target cameras of the subset of target cameras such that a field of view of the one or more target cameras of the subset of target cameras is centered with respect to the centroid; compute for one or more target cameras of the subset of target cameras a zoom factor, the zoom factor calculated by determining a narrowest field of view angle of the target camera that encompasses the entire topographical area of interest as determined from the area data object; and generate transmission commands for the subset of target cameras based on the computed zoom factor and the computed pan and tilt angles.

Another broad aspect is a computer-readable medium storing instructions executable by a computer device for receiving an area data object defining the topographical area of interest comprising dimension parameters defining at least two dimensions of the topographical area of interest and position parameters defining a position for the topographical area of interest; deriving a centroid of the topographical area of interest from the area data object; determining a subset of target cameras from the set of cameras having a zone of potential coverage comprising the topographical area of interest; computing pan and tilt angles for one or more target cameras of the subset of target cameras such that a field of view or the one or more target cameras of the subset of target cameras is centered with respect to the centroid; computing for one or more target cameras of the subset of target cameras a zoom factor, the zoom factor calculated by determining a narrowest field of view angle of the target camera that encompasses the entire topographical area of interest as determined from the area data object; and generating transmission commands for the subset of target cameras based on the computed zoom factor and the computed pan and tilt angles.

BRIEF DESCRIPTION OF THE DRAWINGS

The invention will be better understood by way of the following detailed description of embodiments of the invention with reference to the appended drawings, in which.

DETAILED DESCRIPTION

Aspects of the present disclosure provide systems and methods for controlling a set of cameras such that the cameras focus on an area of interest by adjusting, when need be, the pan-tilt (PT) parameters and the zoom parameters of the cameras.

Figure 1:
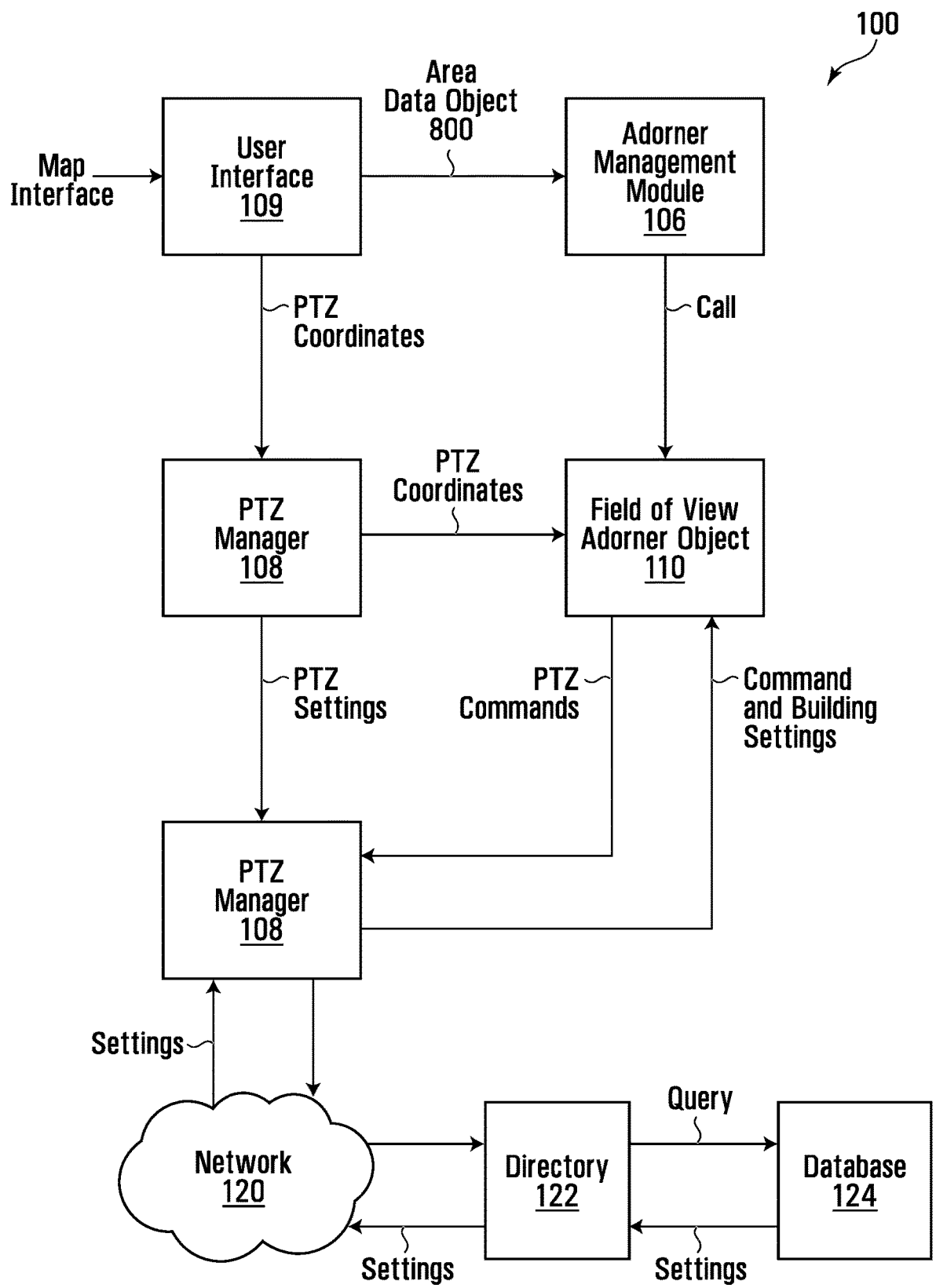
FIG. 1 is a block diagram of an exemplary camera control system.

Reference is made to FIG. 1, illustrating an exemplary system for controlling cameras 100.

By using the system 100, a user may define a polygon (e.g. a square or rectangle) on a 2D map of an area of interest with respect to which the cameras are to be directed to. Cameras that can cover the area of interest are then identified, and PT and/or zoom commands are generated and transmitted to the cameras such that the cameras are directed to and zoom in on the area of interest.

In the present disclosure, by "field of view", it is meant the open observable area that can be captured by a camera.

The system 100 has a user input interface 102, an adorner management module 106, a PTZ (pan-tilt-zoom) manager 108 and one or more field of view adorner objects 110 (where there may be a field of view adorner object 110 for each camera controlled or controlled by the system 100, and, in some embodiments, that appear in a geographic region delimited and represented by a 2D map).

The system 100 is connected or connectable to one or more camera resources 150 (e.g. the cameras of a surveillance system) that are controllable by the system 100. The cameras 150 may be preferably pan-tilt-zoom cameras (PTZ cameras). The system 100 may be connected to the cameras via a network 120 (e.g. a wireless network, a wired network, etc.)

The system 100 may have a directory proxy 112 that is enabled to control how requests of the system 100 (e.g. by the PTZ manager 108 and/or the FOV adorner object(s) 110) are routed to backend data sources. The directory proxy 112 is in communication with the network 120 (wired or wireless network). The network 120 is in turn connected to one or more directories 112, that are connected to one or more databases 124.

The databases 124 may be memory that store data containing information on the cameras 150 that can be controlled by the system 100, such as the current pan/tilt or zoom settings of the cameras 150. These settings of the cameras can be transferred to the system 100 for further processing by same.

As such, the system 100 receives information on the cameras 150 that can be controlled by the system 100, and transmits transmission commands (e.g. pan/tilt and/or zoom commands) back to the cameras such that the settings of the cameras can be adjusted such that they focus on the area of interest.

The user input interface 102 may receive a map instance from a network (e.g. Google Maps™) of a given geographical region. The user may define an area of interest on the user input interface 102, defining an area on the 2D map. The area of interest is defined by an area data object 800.

An area data object 800 is a data structure representing a topographical area of interest to which cameras are to be directed to in order to obtain image streams of the topographical area of interest. The topographical area of interest may be an area defined by a user on a 2D map appearing, e.g., on a display. As such, the user may define the topographical area of interest using the user input interface 102, the user tracing out, e.g. with a mouse or with his finger on a touchscreen, the topographical area of interest.

In other examples, the topographical area of interest may be defined by the system 100. For instance, the user may select a camera that is currently focusing on a specific area. By selecting the camera, the system 100 may define an object of interest to be what the camera is currently focusing on (a point of interest). It will be understood that the object of interest may be, in some examples, a view of interest or an area of interest, where the object of interest is based on the current view of the camera. Similarly the object of interest may be an area defined by a user by drawing the area on a map representation. Thus in these examples, the 'object' of interest is an area of interest. The object of interest, based on the settings and parameters of the selected camera, may be converted to mapscale, the object represented by a set of coordinates. The object of interest may therefore be considered by the system 100 as a centroid for an area of interest, the dimensions of the area of interest then further defined based on an increased or decreased zoom of the camera. For instance, the depth of the area of interest may be defined by a range of zoom parameters of the camera or a range of distance of focus of the camera (e.g. +/−30%).

In particular, providing for derive a camera field of view/camera parameters, from a defined area of interest, it is also possible to derive an object/area of interest from a camera field of view. This may be useful, for example when a user is viewing the output of one camera that is capturing a scene and wants other cameras to focus on the same scene.

The method may include defining an area of interest, in this example a rectangle, within or overlapping the camera's field of view. In this example we define a rectangle aligned with the camera's orientation. In a first step, a centroid for the area of interest is defined relative to the camera's field of view. In particular, here the centroid is defined as the point at the current viewing distance of the camera in the middle of the field of view. The area is then defined around (relative to) the centroid and in this example also relative to the field of view of the camera. In one particular example, we define the right and left outer edges of the topographical area of interest as intersecting with the corresponding outer edge of the field of view adorner object at the current distance from the camera (i.e. at the same linear distance from the camera as the centroid). In this example, the top and bottom edges of the topographical area of interest may be defined at + and − a percentage of the distance of the centroid from the camera (e.g. +/−30% of the current distance).

Other schemes of defining an object/area of interest relative to the field of the view may be used. In an alternative embodiment, the topographical area of interest may be defined such that the topographical area of interest is contained within the field of view as define by the FOV adorner object, or within the left and right most edges of the field of view. For example, the centroid may be defined at the current viewing distance of the camera. The top and bottom edges of the topographical area of interest may be defined at + and − a percentage of the distance of the centroid from the camera (e.g. +/−30% of the current distance). The side edges of the topographical area of interest may then be defined by the distance separating the two points where the bottom edge meets the outer edges of the FOV adorner object.

As such, in some embodiments, a user may select a camera amongst a set of cameras, where the selected camera is capturing a scene of interest of which a user may like to get additional perspectives. The topographical area of interest may then be defined by the system 100 based on the selected camera's FOV adorner object and the current viewing distance of the camera. The other cameras can then focus on the area of interest corresponding to the focus of the selected cameras as explained herein.

Figure 8:
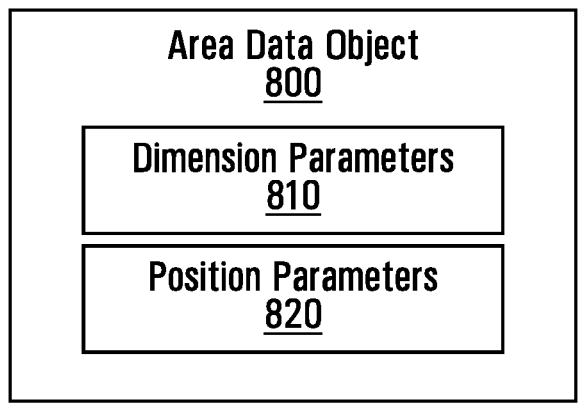
FIG. 8 is a block diagram of an exemplary area data object.

The area data object 800 contains information on the topographical area of interest. For instance, with reference to FIG. 8, the area data object 800 may include the position parameters 820 of the topographical area of interest (e.g. the coordinates of the outer points of the area of interest and its location in, e.g., the 2D map), e.g., with respect to the 2D area. The area data object 800 may also include the dimension parameters 810 of the topographical area of interest (e.g. the width and length of the topographical area data object with respect to the 2D map, of the polygon, of the circle, etc.; represented in two dimensions, in two axes, such as, e.g., the x and y axes). The area data object 800 may be implemented in any suitable way according to the software architectures and paradigms used; it does not necessarily follow the definition of the word object as defined with respect to specific programming languages. For example, it may be provided as data contained in a larger object or class, or in other manners.

The map instance may include a field of view (FOV) layer.

The FOV layer defines the topographical area of interest and also provides for a visual representation on the map instance of field of view objects representing the field of view of each of the cameras, as represented on the map. Each of the cameras may be represented by an icon or a point on the map instance based on the FOV adorner object for each camera. The FOV layer may be overlaid on the map instance. Therefore, changes to the objects of the FOV layer by, e.g., the PZT manager 608 may not require modifying the map instance (only the FOV layer).

A field of view object is an object with a given shape and position appearing on the FOV layer that represents the field of view of a given camera. The field of view object may be defined by a set of coordinates, and may be adapted as a function of the changes in the field of view of the camera (based on its pan-tilt-zoom settings). The PTZ manager 108 may receive the PTZ settings of a camera, and generate PTZ coordinates for the camera that are processed by the PTZ manager 108 into the field of view object appearing in the FOV layer, overlaid on the map instance.

The adorner management module 106 is program code stored in memory, that, once executed by a processor, determines which of the cameras has a zone of potential coverage that can cover the topographical area of interest.

The adorner management module 106 may determine this subset of target cameras by using the information on each of the FOV adorner objects associated respectively with the cameras and based on the information contained in the area data object as explained herein.

Once the adorner management module 106 determines which cameras have a zone of potential coverage that can cover the topographical area of interest, the adorner management module 106 calls each of the FOV adorner objects associated with each of the target cameras. The adorner management module 106 may also determine the target cameras by taking into account parameters of nearby buildings. Data on the nearby buildings may be provided with the map instance. In some examples, data on the nearby buildings may be retrieved, for instance, from a local or external database, storing structure objects providing information on, e.g., the building and/or wall objects. An exemplary structure object may include, but may not be limited to, the following data:

Structure ID: the identification of the structure;
Location: the coordinates indicating the position of the centroid of the structure;
Dimensions: the width, length and shape of the building;
Elevation: the height of the building with respect the ground.

In some embodiments, there may be a FOV adorner object 110 for each camera connected or connectable to the system. In other embodiments, there may be an FOV adorner that is associated to more than one camera (e.g. all of the cameras of a given system), where the FOV adorner would compute and generate the pan/tilt commands and/or zoom commands for all of the target cameras.

The FOV 110 adorner object may be a data structure stored in memory that includes variables and procedures associated to a given camera. The procedures of the FOV adorner object 110 include program code that, when executed by the processor, may at least:

calculate pan/tilt commands for a given camera such that the camera focuses on the topographical area of interest; and
calculate zoom commands for a given camera such that the camera focuses on the topographical area of interest.

The FOV adorner object 110 may receive PTZ coordinates associated to its camera from the PTZ manager 108. The FOV adorner object 110 may further receive camera settings (e.g. the camera state, such as is the camera recording; etc.) and building settings from the directory proxy 112.

In some examples, the FOV adorner object 110 may include the following parameters of the camera to which the FOV adorner object 110 is associated:

Camera ID: identification of the camera;
Current distance: the distance between the camera and the object that the camera is currently focused on;
Current zoom angle: the current field of view angle of the camera;
Offset angle: offset from the center axis of the field of view of the camera;
Pan angle: current pan angle of the camera;
Elevation: the height of the camera with respect the ground;
Coordinates: the coordinates representing the position of the camera;
Max distance: the maximum distance at which the camera can effectively capture an object.
Max Angle: maximum field of view angle when at max zoom.

In other embodiments, the FOV adorner may be program code, stored in memory, that calculates the pan/tilt commands and/or zoom commands for a plurality of cameras. The FOV adorner may obtain camera variables stored in a database, and use those variables, and the area data object, to generate the pan/tilt commands and/or the zoom commands for each of the cameras as explained herein.

The PTZ manager 108 is program code, stored in memory, that, when executed by a processor, manages the field of view objects as they appear in the FOV layer in association with the map instance. As such, the PTZ manager 108 may be pushed camera settings (e.g. PTZ settings) and transmits, and in some cases, calculates the PTZ coordinates for the field of view objects as a function of the updated camera settings for each of the cameras, that, for example, are each represented by a FOV adorner object 110. The PTZ manager 108 may also transmit the calculated PTZ coordinates to the appropriate FOV adorner object 110.

Figure 4:
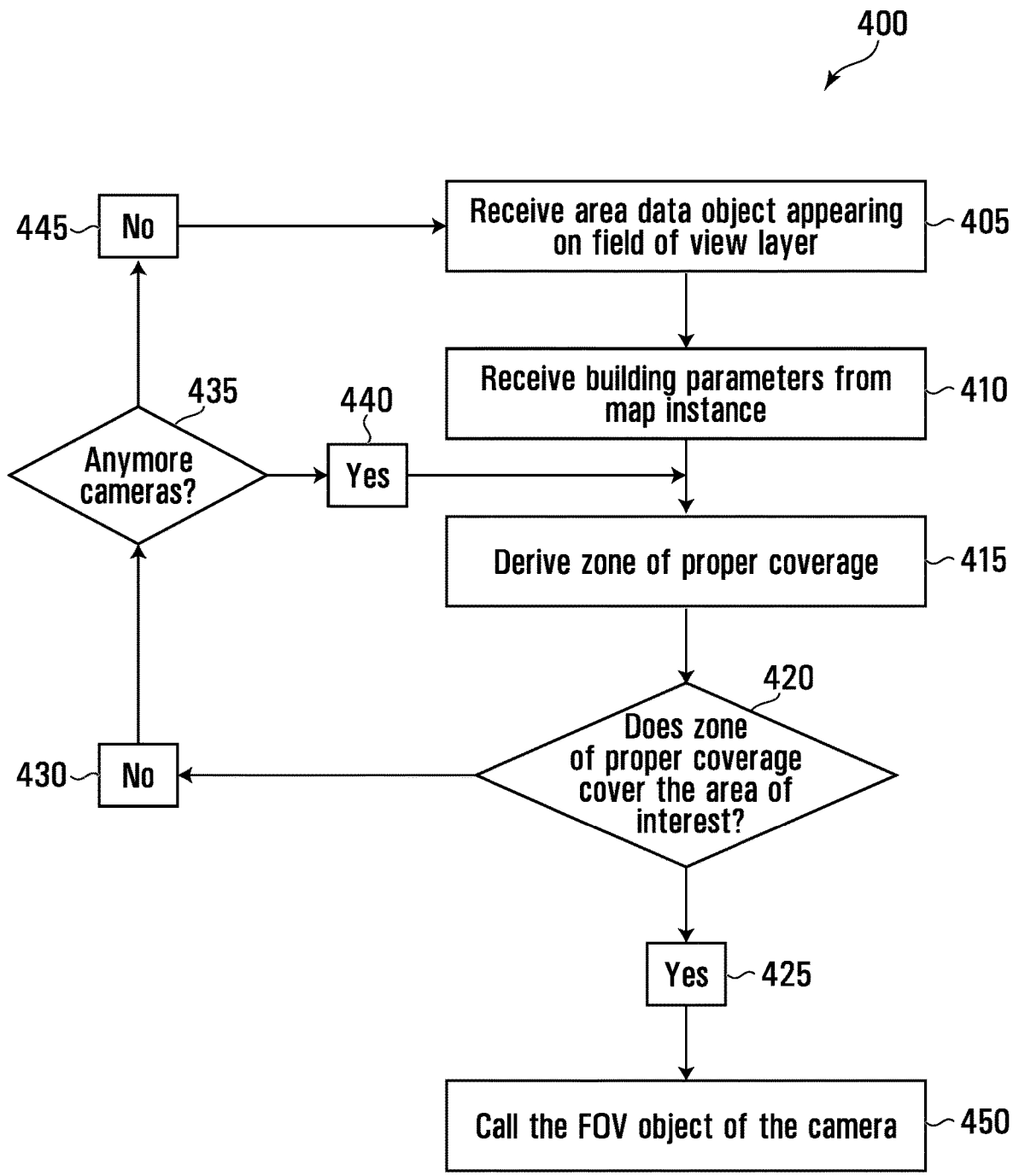
FIG. 4 is a flowchart diagram of an exemplary set of steps of an exemplary adorner management module stored in memory and executed by a processor of an exemplary camera control system.

Adorner Management Module:

Reference is now made to FIG. 4, illustrating an exemplary set of steps carried out by the program code of an adorner management module 106 when executed by a processor.

The adorner management module 106 determines which of the cameras has a zone of potential coverage that can capture the topographical area of interest as defined by the area data object 800.

The zone of potential coverage of a target camera is the total area that can be covered by the field of view of a camera when taking into account all possible pan-tilt-zoom settings. It may be represented as the sum of all possible field of views of the target camera.

The adorner management module 106 receives an area data object 800 when, e.g., the user defines a new topographical area of interest with respect to the map instance (defined on the FOV layer) at step 405. As such, the adorner management module 106 receives from the FOV layer the area data object.

The adorner management module 106 may also receive building parameters associated to building objects appearing on the map instance at step 410. These building parameters may be provided with the map instance, or retrieved from a database storing the building parameters. The building parameters may be further considered by the adorner management module 106 to verify if buildings are hindering the field of view of the cameras, based on the field of view objects associated with each adorner object on FOV layer.

The adorner management module 106 may then derive the zone of proper coverage for a given camera at step 415. As such, the adorner management module 106 may retrieve from, e.g., a FOV adorner object 110 the zone of proper coverage (stored as a variable in the FOV adorner object 110). The adorner management module 106 may calculate the zone of proper coverage of the target camera from data stored in the FOV adorner object 110 (e.g. the MAX field of view and pan/tilt coverage of the camera). The adorner management module 106 may also calculate the impact of a nearby building or structure on the zone of proper coverage of the camera by verifying if the building or structure affects the field of view of the camera.

The adorner management module 106 then verifies if the zone of proper coverage covers the topographical area of interest (as defined by the area data object) at step 420. This may be done by verifying if the zone of proper coverage, when converted to mapscale, overlaps with the topographical area of interest defined in the FOV layer.

If the zone of proper coverage of a camera does cover the topographical area of interest at step 425, the adorner management module 106 then calls the FOV adorner object 110 associated with the camera at step 450. The adorner management module 106 then repeats the steps 400 for the next camera or FOV adorner object appearing on the map instance, associated with a camera connected or connectable to the system 100.

If the zone of proper coverage of a camera does not cover the topographical area of interest at step 430, then the adorner management module 106 verifies if any other FOV adorner objects (or cameras) appearing on the map have not been verified to ascertain if the zone of proper coverage of the camera (or as represented by the FOV adorner object 110) can cover the topographical area of interest based on the area data object at step 435. If so, at step 440, the adorner management module 106 verifies if the zone of proper coverage of the next FOV adorner object (or camera) covers the topographical area of interest as defined by the area data object at step 420.

If not, at step 445, the adorner management module 106 waits for a new area data object, defining a new topographical area of interest, to be received by the camera control system 100.

Exemplary program code representing the adorner management module 106's function of verifying if a camera associated to a FOV adorner object can cover an area of interest is as follows:

```
var smartClickableItems = mapObjects.OfType<ISmartClickCapable>
( ).ToList( );
var      blockingItems   =   mapObjects.OfType<ShapeItem>
( ).Where(x       =>x.BlockFieldOfView).ToList( );
    foreach (var item in smartClickableItems)
    {
       var infos = item.GetSmartClickInformations( );
       if( ItemIsInRange(infos, clickPosition, map, mapEngine)
         && (ClickIsWithinPossibleFOV(infos, clickPosition,
         mapEngine)
                  && !AreBlockingItemsBetweenItemAndClick
(infos,  clickPosition, blockingItems, mapEngine))
       {
          item.OnSmartClick(clickPosition);
       }
    }
```

ISmartClickCappable=verifying with respect to the field-OfViewAdorner objects ShapeItem=Buildings/walls
GetSmartClickInformations=e.g. Latitude, Longitude, Altitude, MaxDistance, Offset, Max AngleOfView
ItemIsInRange=look at max distance of the camera
ClickIsWithinPossibleFoV=maximum angle coverage by the camera.
AreBlockingItemsBetweenitemAndClick=determines if there is an obstruction causes by a structure (e.g. building or wall).
Field of View Adorner Object:

The FOV adorner object 110 includes program code stored in memory that, when executed by a processor, computes pan/tilt commands and/or zoom commands that are transmitted to the camera such that the cameras focus on the topographical area of interest.

Figure 5:
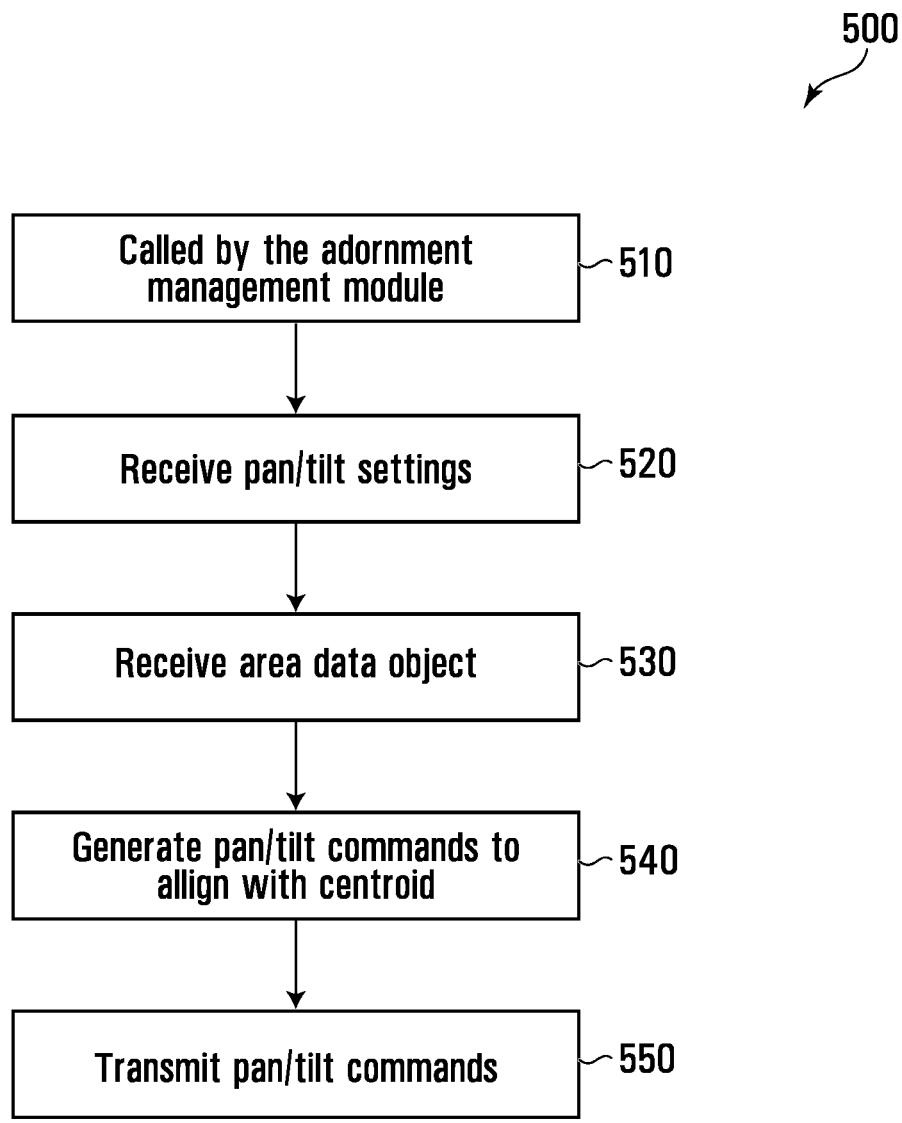
FIG. 5 is a flowchart diagram of an exemplary set of steps for generating pan/tilt commands by an exemplary Field of View (FOV) adorner object stored in memory and executed by a processor of an exemplary camera control system.

Reference is made to FIG. 5, illustrating an exemplary set of steps 500 carried out by the program code of the FOV adorner object 110 for computing the pan/tilt commands to be transmitted to the camera such that the camera adjusts its pan and/or tilt to focus on the topographical area of interest.

As explained herein, multiple FOV adorner objects may be an object represented on a 2D map, where each of the FOV adorner objects represents one of the cameras that is controlled or controllable by the system 100.

The FOV adorner object 110 is called by the adorner management module 106 at step 510.

The FOV adorner object 110 may receive pan-tilt-zoom coordinates from the PTZ manager 108 at step 520. In other embodiments, the FOV adorner object 110 may receive PTZ settings of the camera from the directory proxy 112.

The FOV adorner object 110 may then derive the data area object from the information of the FOV layer in step 530. As such, the FOV adorner object 110 has the area data object and can derive the centroid of the topographical area of interest from the area data object (e.g. width/2; length/2).

In some embodiments, the FOV adorner object 110 may first verify if the camera requires any additional pan/tilt settings as the camera may already have been properly positioned with respect to the centroid of the topographical area of interest. In other embodiments, the FOV adorner object 110 may omit performing this prior verification, performing the pan/tilt setting adjustment calculations, where the results of the calculations result in that no pan/tilt changes are made.

The FOV adorner object 110 then generates the pan/tilt settings to center the field of view of the camera with respect to the centroid of the topographical area of interest at step 540.

An exemplary set of steps carried out by the FOV adorner object 110 to center the field of view of the camera with respect to the centroid may be as follows: To calculate the pan settings of the camera:
 calculate the angle between the centroid of the area of interest and the camera: radians=Math.Atan((centre of the rectangle in y-camPosition.Y)/(centre of rectangle in x-camPosition.X));
 transfer to degrees: angle=radians*180/Math.Pl;
 recalculate with the applied offset:pan=(angle−current−Offset) % 360.
To calculate the tilt settings (with respect to the ground, the field of view distance defines the tilt):
 D=distance between the centroid of the area of interest and the camera while respecting the maximum distance;
 the angle to perform the tilt is in radians: TR=−Math.Atan (D/elevation of the camera)+Math.Pl/2;
 conversion to degrees: Tilt=TR*180/Math.Pl.

The computed pan/tilt commands for the camera are then transmitted by the FOV adorner object 110 to the directory proxy 112 at step 550 such that the pan/tilt commands are sent to the camera (e.g. with the address of the camera resource) such that the pan/tilt settings are adjusted. It will be understood that in some embodiments there may not be any directory proxy 112, where the pan/tilt commands may be sent directly from the FOV adorner object 110 over the network 120 to the camera.

The adjusted pan/tilt settings of the camera may then be sent to the PTZ manager 108, which calculates the PTZ coordinates of the new field of view object appearing on the FOV layer of the map instance in association with the camera and its FOV adorner object 110.

Figure 6:
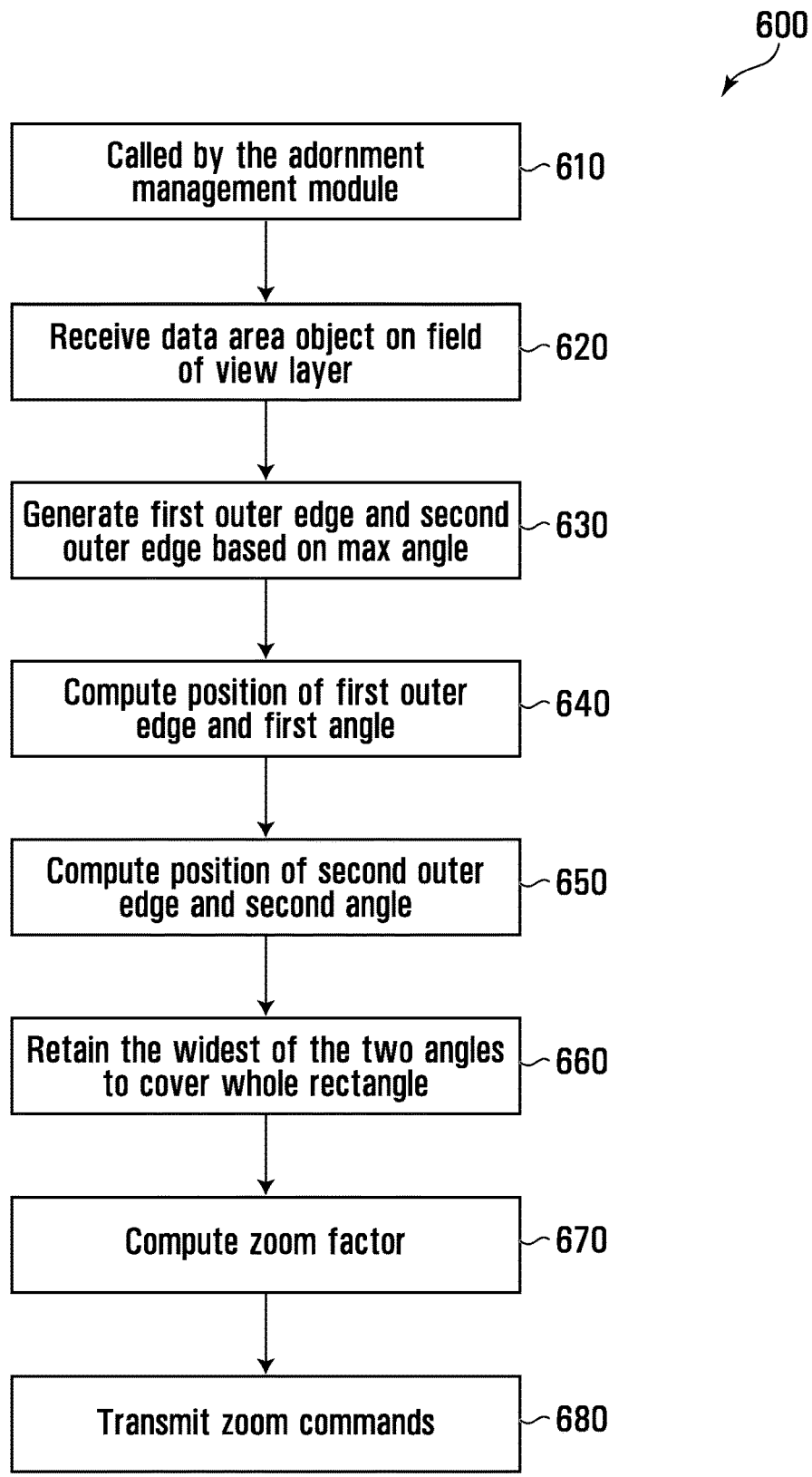
FIG. 6 is a flowchart diagram of an exemplary set of steps for generating zoom commands by an exemplary Field of View (FOV) adorner object stored in memory and executed by a processor of an exemplary camera control system.

Reference is now made to FIG. 6, illustrating an exemplary set of steps carried out by the program code of the FOV adorner object 110 when executed by a processor to adjust the zoom settings of a target camera (e.g. the target camera associated with the FOV adorner object).

The FOV adorner object 110 is called by the adorner management module 106 at step 610.

The FOV adorner object 110 obtains the area data object from the FOV layer representing the topographical area of interest at step 620.

The FOV adorner object 110 then calculates the narrowest field of view angle that encompasses the entire topographical area of interest. The narrowest field of view angle is the smallest field of view angle that covers the entire area of interest. It will be understood that a field of view object (representing the field of view of the camera on the FOV layer overlaid on the 2D map) can be defined by a cone-like shape, where the axis of symmetry of the cone intersects with the centroid of the topographical area of interest, as the field of view object of the camera is centered with respect to the centroid of the topographical area of interest. As such, the angle defined by a first outer edge of the field of view and the axis of symmetry is equal to the angle defined by a opposite second outer edge of the field of view and the axis of symmetry. Therefore, reducing the angle between the first outer edge of the field of view object and the axis of symmetry entails an equal reduction of the angle between the second outer edge of the field of view object and the axis of symmetry.

The narrowest field of view angle to capture the entire area of interest may be derived by the following exemplary set of steps.

A field of view object (e.g. an object represented on a map representative of the field of view of the camera) at the maximum field of view angle may be defined by the FOV adorner object 110. The field of view object at the maximum field of view angle has a first outer edge on one side and a second outer edge on the opposite side, generated from or with the field of view object at the maximum field of view angle at step 630.

Figure 7:
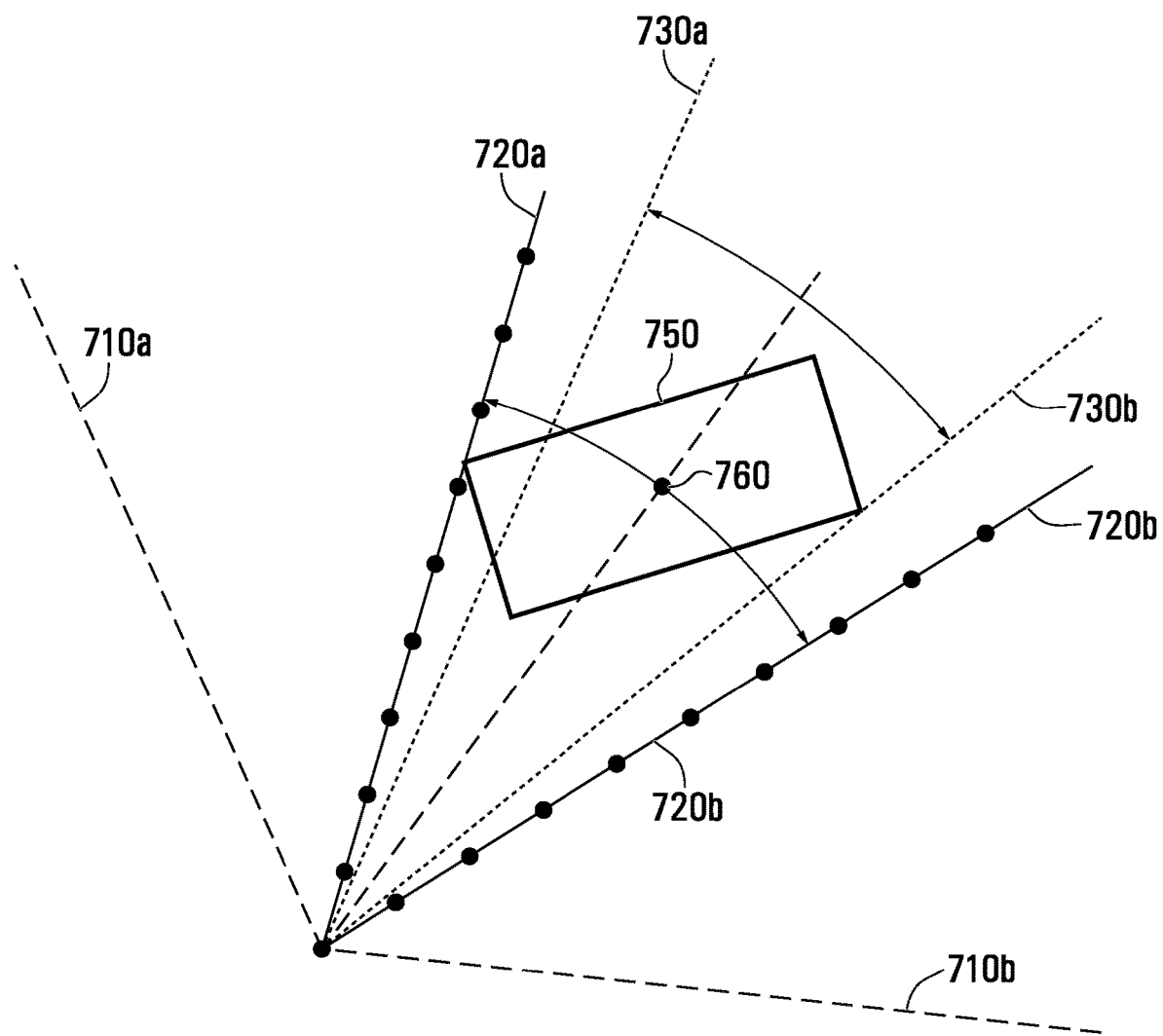
FIG. 7 is a drawing of different field of view angles considered when computing the narrowest field of view angle covering the entire area of interest.

Reference is also made to FIG. 7, illustrating in stippled lines the outer edges 710a and 710b of the field of view object at the maximum field of view angle.

The topographical area of interest 750 is defined around centroid 760. The axis of symmetry of the field of view of the camera intersects with the centroid 760, as the field of view of the camera represented in FIG. 7 is centered with respect to the centroid 760.

The FOV adorner object 110 calculates the position of the first outer edge 710a at a first position (and the first angle of the field of view) at step. 640. In some embodiments, the first position of the first outer edge and the first angle may be defined by rotating the first outer edge 710a in a first direction until the first outer edge 710a comes into contact with the topographical area of interest. For instance, this first position of the first outer edge 720a is when the first outer edge comes into contact with a corner or a side of the topographical area of interest. Due to the symmetry between the first outer edge 710a, the axis of symmetry of the field of view and the second outer edge 710b, the second outer edge 710b undergoes a corresponding rotation in the opposite direction (e.g. zooming in). The first angle is computed by the FOV adorner object 110 as the angle between the first outer edge 720a and the second outer edge 720b.

The FOV adorner object 110 calculates the position of the second outer edge 710b at a second position (and the second angle of the field of view) at step 650. In some embodiments, the position of the second outer edge and the second angle may be defined by rotating the second outer edge 710b in a second direction (e.g. counter-clockwise in the example of FIG. 7) until the second outer edge 710b comes into contact with the topographical area of interest 750. For instance, this position of the second outer edge 730b is when the second outer edge comes into contact with a corner or a side of the topographical area of interest 750. Due to the symmetry between the first outer edge 710a, the axis of symmetry of the field of view and the second outer edge 710b, the first outer edge 710a undergoes a corresponding rotation in an opposite direction (e.g. zooming in), resulting in the first outer edge 710a moving to position 730a. The second angle of the field of view is defined by the FOV adorner object 110 as the angle between the first outer edge 730a and the second outer edge 730b.

The FOV adorner object 110 retains as the narrowest field of view angle the field of view angle (field of view angle 1 computed at step 640 and field of view angle 2 computed at step 650) that captures the entire topographical area of interest at step 660. As shown in FIG. 7, even though the second field of view angle, defined by the first outer edge 730a and the second outer edge 730b, is inferior to the first field of view angle defined by the first outer edge 720a and the second outer edge 720b, the first outer edge 730a defining the second field of view angle leaves out of the field of view a portion of the topographical area of interest.

As a result, the FOV adorner object 10 retains as the narrowest field of view angle the broadest of the first field of view angle and the second field of view angle, as the broadest angle captures the entire topographical area of interest in the field of view, despite where there may be some excess space between an outer edge of the field of view and the topographical area of interest (as shown in the example of FIG. 7 between the topographical area of interest 750 and the second outer edge 720b).

The FOV adorner object 110 then calculates the zoom factor from the narrowest field of view angle (e.g. Zoom Factor=MaxAngle/(MaxAngle−narrowest field of view angle)), and the zoom commands for adjusting the zoom settings of the corresponding camera, as a function of the computed narrowest field of view angle at step 670.

The zoom commands are then transmitted over the network 120 (in some examples, via directory proxy 112; or an input/output interface) to the camera resource corresponding to the FOV adorner object 110, or with respect to which the calculated zoom commands are to be sent at step 680.

The adjusted zoom settings of the camera may then be sent to the PTZ manager 108, which calculates the PTZ coordinates of the new field of view object appearing on the FOV layer of the map instance in association with the camera and its FOV adorner object 110. The field of view object appearing on the FOV layer is adjusted as a result.

Exemplary program code of the FOV adorner object 110 corresponding to the calculating of the narrowest field of view angle, when the area of interest is in the shape of a rectangle, is as follows:

```
/// <summary>
/// Calculates the optimal zoom from the rectangle defined by the user
/// </summary>
/// <param name="smartDragRectangle">the rectangle to zoom in</param>
```

```
    /// <returns>The zoom factor to apply</returns>
    private double CalculateZoom(Rect smartDragRectangle)
    {
        Point?   itemLocPoint   =   m_mapEngine.CoordinateToPixel(new
Coordinate(m_fieldOfViewMapItem.Latitude, m_fieldOfViewMapItem.Longitude));
        if (!itemLocPoint.HasValue)
            return 0;
        Point itemPoint = itemLocPoint.Value;
        double radius = ComputeCurrentDistance( ) * 2; // be sure to reach a side
of the smart drag rectangle by doubling its size;
        Point baseFovPoint = new Point(itemPoint.X + radius, itemPoint.Y); // start
at 90 degrees.
        Segment baseSegment = new Segment(itemPoint, baseFovPoint);
        // Find the optimal zoom angle from the current Angle
        var  optimalAngle  =  FindZoomOptimalViewAngle(baseSegment,  Angle,
smartDragRectangle);
        //with this angle calculate the ratio of the max angle, it will give us the zoom
factor.
        return Math.Max(1, AngleOfView / (AngleOfView – optimalAngle * 2));
    }
    /// <summary>
    /// Find the optimal angle to have the whole SmartDragRectangle into view
    /// </summary>
    ///  <param  name="baseSegment">The  base  segment  that  we  will
project</param>
    /// <param name="currentAngle">The current good angle in direction of the
rectangle's center</param>
    /// <param name="smartDragRectangle">The smart drag rectangle to adjust
zoom in</param>
    /// <returns>The angle to inflate from the max zoomed out view</returns>
    private double FindZoomOptimalViewAngle(Segment baseSegment, double
currentAngle, Rect smartDragRectangle)
    {
        var smartDragRectangleGeometry = new RectangleGeometry { Rect =
smartDragRectangle };
        // start at max angles and lower until we hit the SmartDragRectangle
        double startAngle = currentAngle – AngleOfView / 2;
        double endAngle = currentAngle + AngleOfView / 2;
        // from start to end
        double angleFromStart;
        for  (angleFromStart  =  startAngle;  angleFromStart  <=  endAngle;
angleFromStart += 1)
        {
            Segment  rotateSegment  =  new  Segment(baseSegment.PointA,
baseSegment.PointB);
            // rotation is counterclockwise
            rotateSegment.Rotate(-1 * (angleFromStart – 90));
            LineGeometry      lineGeometry       =      new
LineGeometry(rotateSegment.PointA, rotateSegment.PointB);
            IntersectionDetail        details        =
smartDragRectangleGeometry.FillContainsWithDetail(lineGeometry);
            if (details != IntersectionDetail.Empty)
            {
                break;
            }
        }
        // from end to start
        double angleFromEnd;
        for  (angleFromEnd  =  endAngle;  angleFromEnd  >=  startAngle;
angleFromEnd -= 1)
        {
            Segment  rotateSegment  =  new  Segment(baseSegment.PointA,
baseSegment.PointB);
            // rotation is counterclockwise
            rotateSegment.Rotate(-1 * (angleFromEnd – 90));
            LineGeometry      lineGeometry       =      new
LineGeometry(rotateSegment.PointA, rotateSegment.PointB);
            IntersectionDetail        details        =
smartDragRectangleGeometry.FillContainsWithDetail(lineGeometry);
            if (details != IntersectionDetail.Empty)
            {
                break;
            }
        }
        // take the widest angle to see the whole rectangle
        var optimalAngle = angleFromStart – startAngle;
```

```
        if (endAngle - angleFromEnd < optimalAngle)
        {
            optimalAngle = endAngle - angleFromEnd;
        }
        return optimalAngle;
}
```

Graphical User Interface:

Reference is now made to FIGS. 9A-9D, illustrating exemplary snapshots of graphical user interface screens in accordance with teachings of the present disclosure.

Figure 9A:
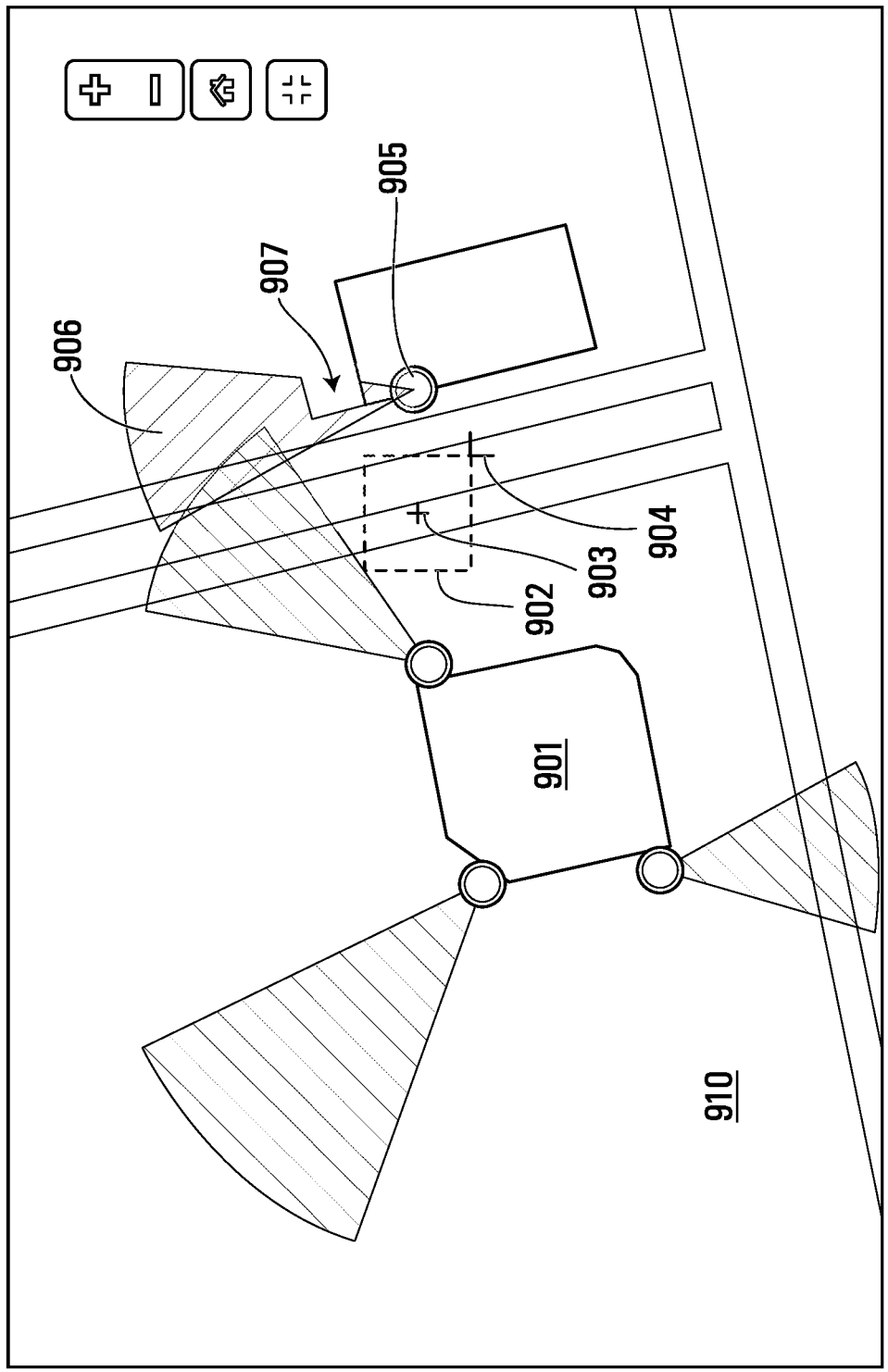
FIG. 9A-9D illustrate exemplary graphical user interfaces appearing on a display of an exemplary camera control system.

FIG. 9A shows an exemplary user interface with a 2D map 910 (two-dimensions, x and y) and a FOV layer overlaid thereon. In FIG. 9A, the user is defining a topographical area of interest 902 by dragging pointer 904. The centroid 903 is shown on the 2D map 910 at the center of the topographical area of interest 902.

The map 910 may be, for example, one generated from a third-party map database, such as Google Maps™.

The buildings 901 and 907 are also shown as two-dimensional objects (represented in the x and y axes) on the map 910.

The camera icons 905, representing the cameras, are graphically represented as icons on the map 910 in mapscale at the position of the cameras.

The FOV adorner objects or field of view objects 906 of the cameras are represented on the FOV layer of the map with a conical shape, representing the current field of view of the cameras based on the coordinates calculated by the PTZ manager 108 from the PTZ settings of the cameras.

As shown in FIG. 9A, the field of view objects may be adjusted (e.g. by the adorner management module 106 and/or the PTZ manager 108) to account for structures that may obstruct the field of view of the cameras (e.g. the field of view object 906 that is partially cut due to the obstruction causes by building 907).

Figure 9B:
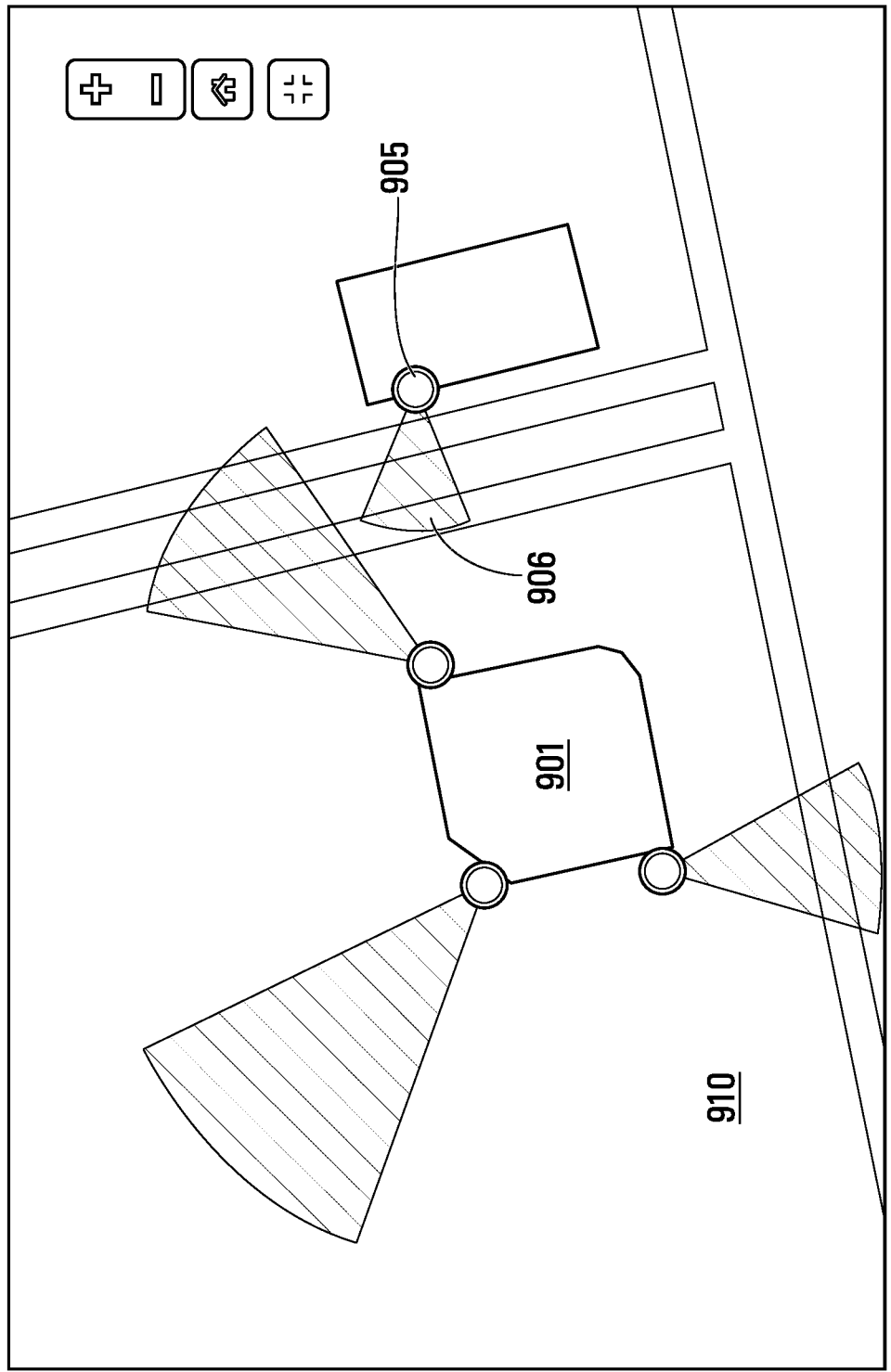

FIG. 9B illustrates the field of view adorner object 906 changing direction such that it is now centered with respect to the centroid 903 of the topographical area of interest 902 inputted by the user in FIG. 9A.

Figure 9C:
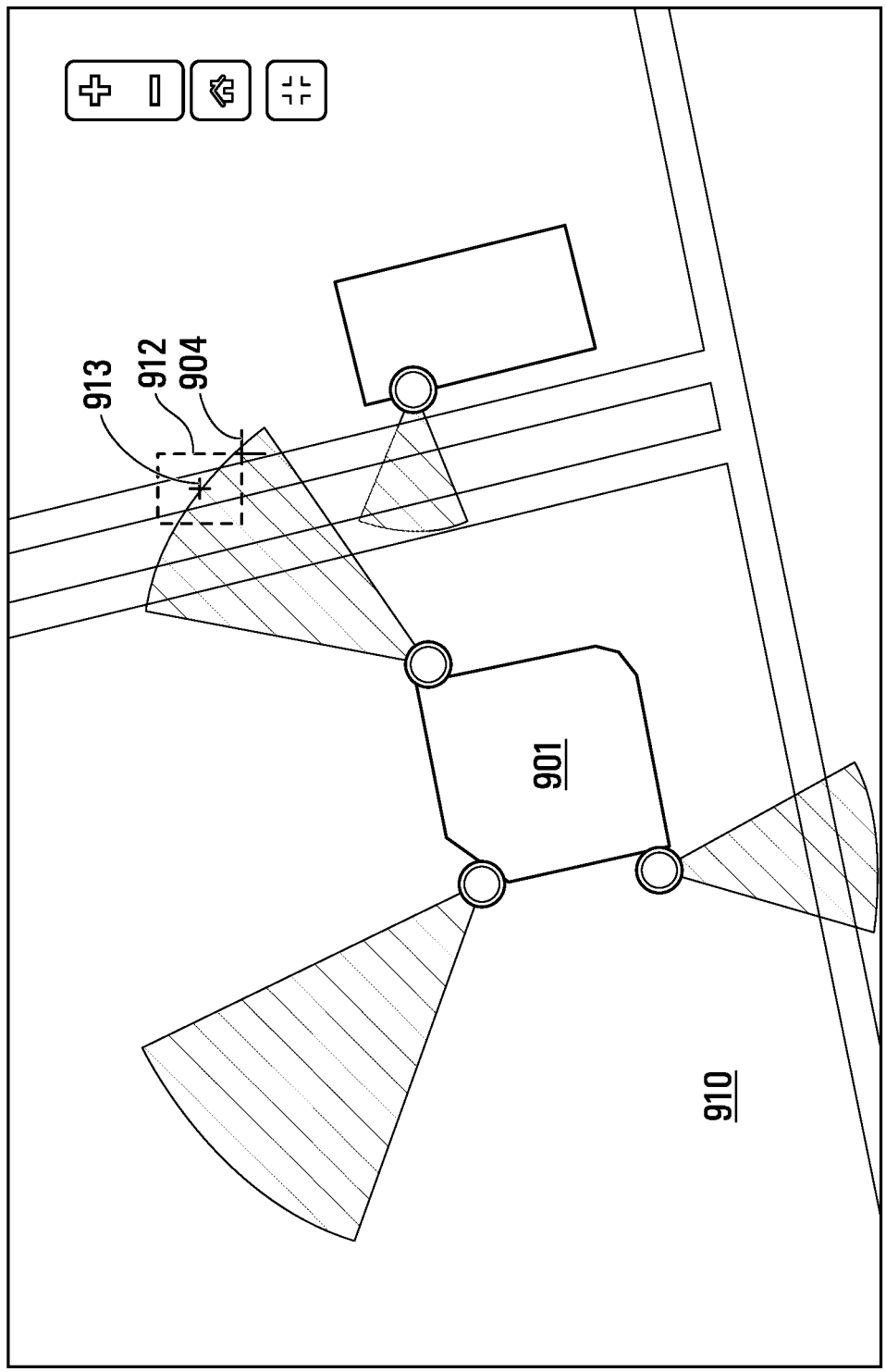

In FIG. 9C, the user, with cursor 904, is defining a new topographical area of interest 912 with a new centroid 913. The centroid 913 is already aligned with the axis of symmetry of one of the field of view objects.

Figure 9D:
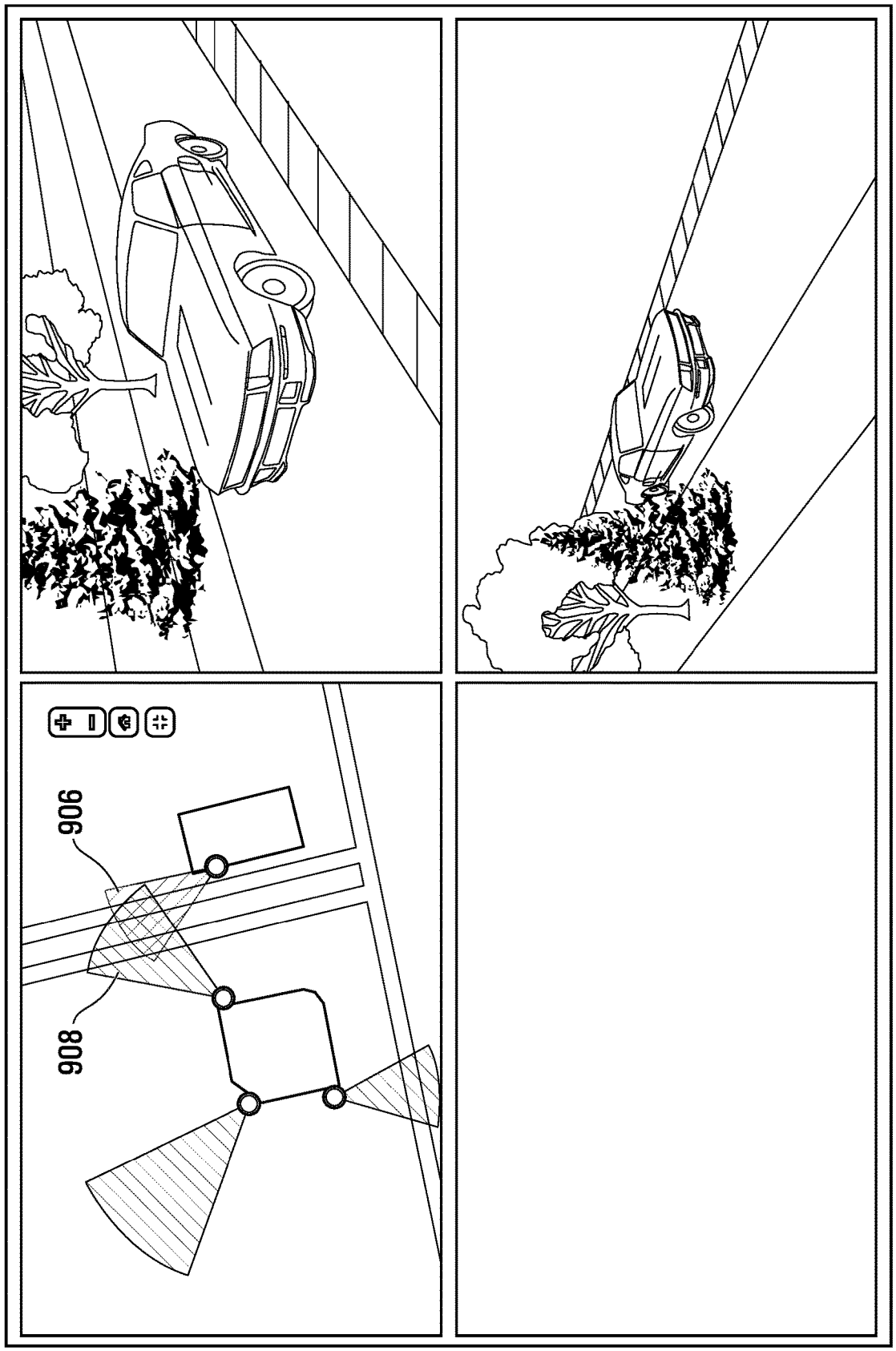

FIG. 9D shows the new position of field of view adorner object 906. The field of view of the camera corresponding to the field of view adorner object 906 was adjusted to be positioned and zoomed in on the topographical area of interest 912. The new PTZ settings following these adjustments were sent to the PTZ manager 908. The new coordinates of the field of view adorner object 906 are computed by the PTZ manager 908, and the shape of the field of view adorner object 906 appearing on in the FOV layer over the 2D map is adjusted accordingly, such that the new shape of the field of view object 906 appears on the graphical user interface.

FIG. 9D also shows the video streams of the cameras that are capturing the topographical area of interest. As such, a user may be rapidly provided with multiple views an object of interest appearing on the user interface, the cameras capturing the topographical area of interest.

The image streams may include a video timeline to, e.g., position, replay, accelerate or decelerate the video stream.

Figure 3:
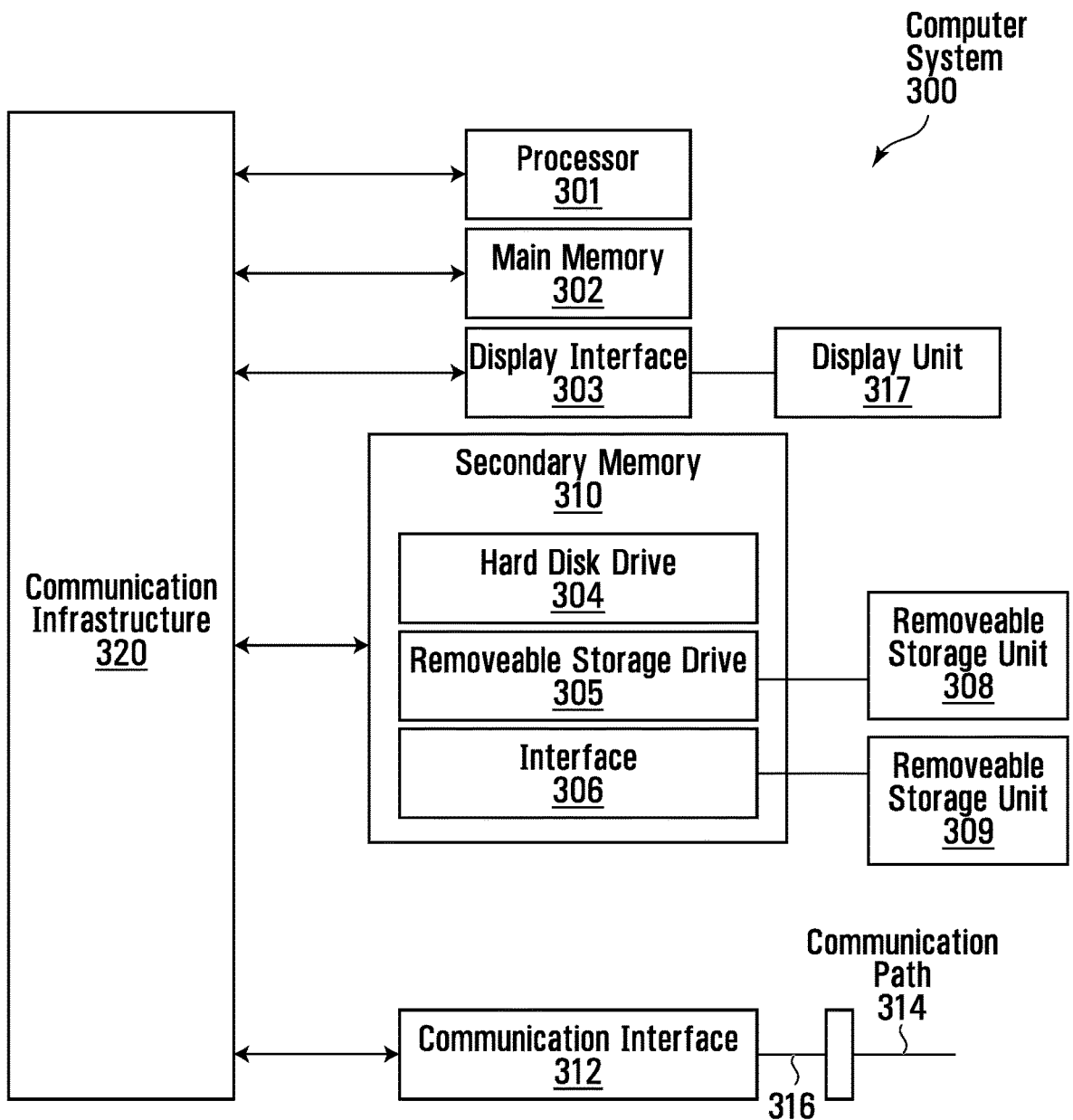
FIG. 3 is a block diagram of various features of an exemplary computer system for use with aspects of the present disclosure.

Aspects of the present disclosure may be implemented using hardware, software, executed by a processor, or a combination thereof and may be implemented in or more computer systems. For example, the user interfaces illustrated in FIGS. 9A-9D may be implemented as a computer system or processing system. In an aspect of the present disclosure, various features may be directed toward one or more computer systems capable of carrying out the functionality described therein. An example of a computer system may be the one illustrated in FIG. 3.

The computer system 300 includes one or more processors, such as processor 301. The processor 301 is coupled to a communication infrastructure 320 (e.g. a communications bus, cross-over bar, network, etc.). However, it will be apparent to a person of ordinary skill in the art how to implement aspects hereof using other computer systems and/or architectures.

The computer system 300 may include a display interface 303 that forwards graphics, text, and other data from the communication infrastructure 320 (or from a frame buffer, not shown) for display on a display unit 317. Computer system 300 may include a main memory 302 (e.g. random access memory—RAM), and may also include secondary memory 310. The secondary memory 310 may include, for example, a hard disk drive 304 and/or a removable storage drive 305, e.g., optical disk drive. The removable storage drive 305 may read from and/or write to a removable storage unit 308. The removable storage unit 308 may include a computer readable storage medium having stored therein computer software and/or data.

Alternative aspects of the present disclosure may include secondary memory 310 and may include other similar devices for allowing computer programs or other instructions to be loaded into computer system 300. These devices may include, for instance, a removable storage unit 310 and an interface 306. Examples of such may include, for instance, a removable memory chip (such as an erasable programmable read only memory (EPROM), or programmable read only memory (PROM)) and its associated socket, and other removable storage units 310 and its interface 306, which allow software and data to be transferred from the removable storage unit 310 to the computer system 300.

Computer system 300 may also include a communications interface 312. The communication interface 312 may allow software and data to be transferred among the computer system 300 and external devices. Examples of communication interface 312 may include, but are not limited to, a modem, a network interface (such as an Ethernet card), a communications port, a Personal Computer Memory Card International Association (PCMCIA) slot and card, etc. Software and data transferred via communications interface 312 may be in the form of signals 316, which may be electronic, electromagnetic, optical and other signals capable of being received by communications interface 312. These signals 316 may be provided to communications interface 312 via a communications path (e.g. channel) 314.

This communications path 314 may carry signals 628 and may be implemented using wire or cable, fibre optics, a telephone line, a cellular link, a radio frequency (RF) link and/or other communications channels. As used herein, the terms "computer readable medium", "computer program medium", and computer usable medium" refer generally to media such as a removable storage drive 305, and/or a hard disk installed in the hard disk drive 304.

Computer programs and/or data may be stored in main memory 302 and/or secondary memory 310. Computer programs and/or data may also be received via communications interface 312. Such computer programs, when executed, may enable the computer system 300 to perform the features in accordance with aspects of the present disclosure as discussed herein. In particular, the computer programs, when executed, may enable the processor 301 to perform the features in accordance with aspects of the present disclosure. Accordingly, such computer programs may represent controllers of the computer system 300.

Where aspects of the present disclosure may be implemented using software, the software may be stored in a computer program produced and loaded into the computer system 300 using removable storage drive 305, hard disk drive 304, or interface 306. The control logic (software), when executed by processor 301, may cause the processor 301 to perform the functions described herein. In another aspect of the present disclosure, the system may be implemented primarily in hardware using, for example, hardware components, such as application specific integrated circuits (ASICs). Implementation of the hardware state machine so as to perform the functions described herein will be apparent to persons of ordinary skill in the art. In yet another variation of the present disclosure, aspects of the present disclosure may be implemented using a combination of both hardware and software.

Figure 2:
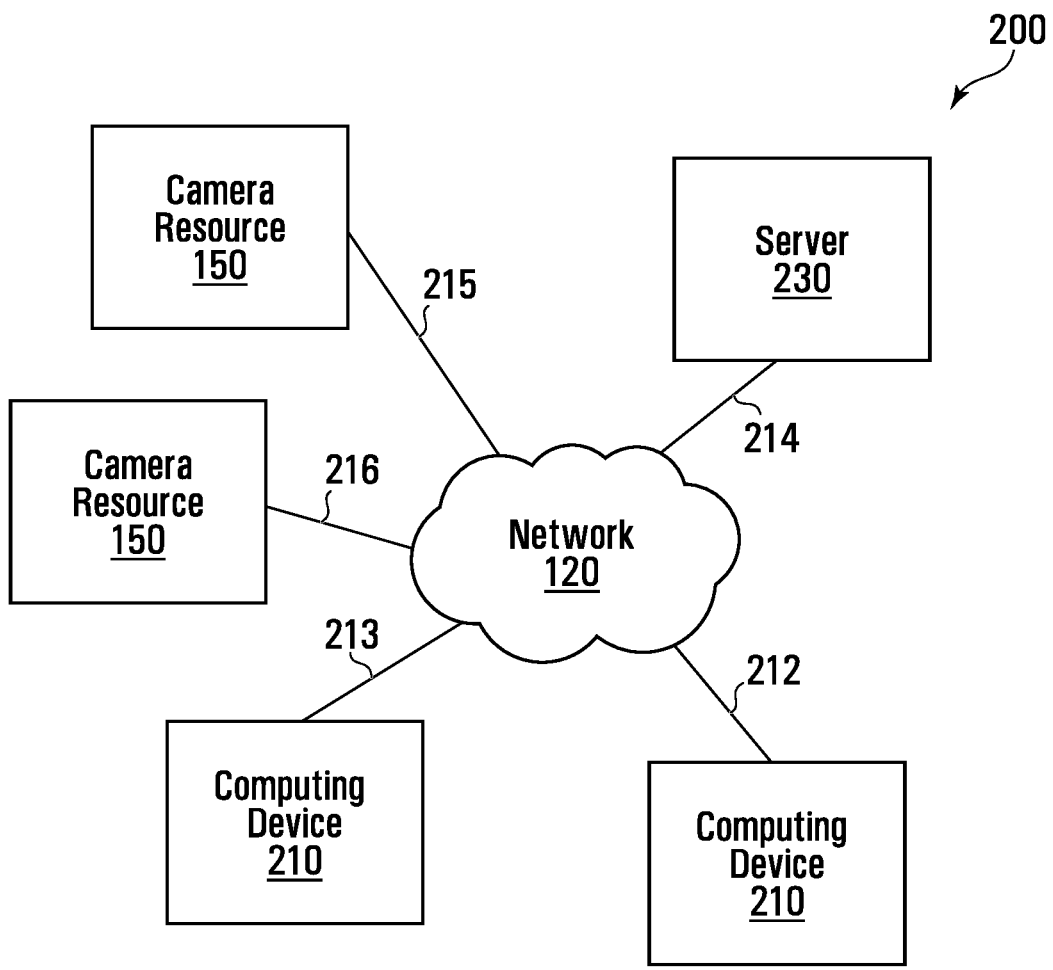
FIG. 2 is a block diagram of an exemplary system of various hardware components and other features for use in accordance with aspects of the present disclosure.

FIG. 2 shows various elements of an exemplary network architecture 200 used in accordance with the present disclosure. The network architecture 200 has one or more terminals 210, allowing users to access the system. The terminal 210 may be, for instance, a personal computer, a minicomputer, a mainframe computer, a microcomputer, a telephonic device, a wireless device, a personal digital assistant, a hand-held wireless device (e.g. wireless telephone; a tablet device) coupled to a server 230, such as a personal computer, a minicomputer, mainframe computer, microcomputer, or other device having a processor and a repository for data and/or connection to a repository for data, via, for example, a network 120, such as the Internet or an intranet, and/or a wireless network, and couplings 212, 213, 214, 215 and 216. The couplings 212, 213, 214, 215 and 216 may include, for example, wired, wireless, or fibreoptic links. The network architecture 200 may also include one or more camera resources 150 that are controlled or controllable by the camera control system 100.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of controlling cameras from a set of two or more cameras in a geographical region to obtain image streams capturing a topographical area of interest comprising:
    receiving an area data object defining the topographical area of interest comprising dimension parameters defining at least two dimensions of the topographical area of interest and position parameters defining a position for the topographical area of interest;
    deriving a centroid of the topographical area of interest from the area data object;
    automatically determining, through an analysis of possible field of views for each camera of the set of cameras to define a zone of potential coverage for the each camera, a subset of target cameras from the set of cameras, wherein the having a zone of potential coverage of each camera of the subset of the target cameras comprises the entire topographical area of interest;
    computing pan and tilt angles for one or more target cameras of the subset of target cameras such that a field of view of the one or more target cameras of the subset of target cameras is centered with respect to the centroid;
    computing for one or more target cameras of the subset of target cameras a zoom factor, the zoom factor calculated by determining a narrowest field of view angle of the target camera that encompasses the entire topographical area of interest as determined from the area data object; and
generating transmission commands for the subset of target cameras based on the computed zoom factor and the computed pan and tilt angles.

2. The method as defined in claim 1, wherein the area data object relates to a two-dimensional map.

3. The method as defined in claim 1, wherein the receiving the area data object comprises:
    receiving a camera selection of the set of cameras; and
    generating corresponding to the camera selection.

4. The method as defined in claim 3, wherein the generating the area data object further comprises:
    identifying an object of interest in the field of view of the selected camera;
    converting to map scale, wherein the object of interest is defined by a set of coordinates; and
    generating the area data object such that the two-dimensional area of interest covers the set of coordinates of the object of interest.

5. The method as defined in claim 1, wherein the determining a subset of target cameras of the set of cameras is further determined by an elevation parameter of the target camera.

6. The method as defined in claim 5, wherein the determining a subset of target cameras of the set of cameras further considers elevation parameters of buildings and walls that can affect a field of view of one or more cameras of the set of cameras.

7. The method as defined in claim 1, wherein the calculating the zoom factor and the narrowest field of view angle comprises computing a first outer edge of the field of view of the camera of the one or more target cameras that intersects with the two-dimensional area of interest at the broadest angle defined from the central axis of the field of view of the camera of the one or more target cameras.

8. The method as defined in claim 7, wherein the computing the zoom factor of the camera, with the field of view object centered with respect to the centroid, comprises:
   computing a position of a first outer edge of a field of view object that contacts the two-dimensional area of interest based on the dimension information of the two-dimensional area of interest and the position parameters of the two-dimensional area of interest;
   computing a position of a second outer edge of the field of view object that contacts the two-dimensional area of interest based on the dimension information of the two-dimensional area of interest and the position parameters of the two-dimensional area of interest;
   determining the narrowest field of view angle from the position of the first outer edge and the position of the second outer edge; and
   calculating the zoom factor from the narrowest field of view angle.

9. The method as defined in claim 8, wherein the computing the position of the first outer edge comprises performing a rotation of the first outer edge of the field of view object at a maximum field of view angle of the target camera in a first direction and identifying the position of the first outer edge of the field of view object when the first outer edge contacts the two-dimensional area of interest, and wherein the computing the position of the second outer edge comprises performing a rotation of the second outer edge of the field of view object at a maximum field of view angle of the target camera in a second direction and identifying the position of the second outer edge of the field of view object when the second outer edge contacts the two-dimensional area of interest.

10. The method as defined in claim 9, wherein the calculating the zoom factor of the target camera is further computed from a maximum distance of the target camera and a maximum field of view angle of the target camera.

11. The method as defined in claim 9, wherein the dimension parameters define a two-dimensional area of interest with a polygonal shape, wherein the first outer edge of the field of view object contacts at least a first corner of the two-dimensional area of interest, and wherein the second outer edge of the field of view object contacts at least a second corner of the two-dimensional area of interest.

12. A computer device for controlling cameras from a set of two or more cameras in a geographical area comprising:
   a memory to store data and instructions;
   a processor in communication with the memory; and
   a computer-readable camera controlling application accessible via the memory and the processor, wherein the camera controlling application is operable to:
   receive an area data object defining the topographical area of interest comprising dimension parameters defining at least two dimensions of the topographical area of interest and position parameters defining a position for the topographical area of interest;
   derive a centroid of the topographical area of interest from the area data object;
   automatically determine, through an analysis of possible field of views for each camera of the set of cameras to define a zone of potential coverage for the each camera, a subset of target cameras from the set of cameras, wherein the zone of potential coverage of each camera of the subset of the target cameras comprises the entire topographical area of interest;
   compute pan and tilt angles for one or more target cameras of the subset of target cameras such that a field of view of the one or more target cameras of the subset of target cameras is centered with respect to the centroid;
   compute for one or more target cameras of the subset of target cameras a zoom factor, the zoom factor calculated by determining a narrowest field of view angle of the target camera that encompasses the entire topographical area of interest as determined from the area data object; and
   generate transmission commands for the subset of target cameras based on the computed zoom factor and the computed pan and tilt angles.

13. The computer device as defined in claim 12, wherein the area data object relates to a two-dimensional map.

14. The computer device as defined in claim 12, wherein the camera coordination application is operable to:
   receive a camera selection of the set of cameras; and
   generate the area data object of the two-dimensional area of interest from a field of view of a selected camera corresponding to the camera selection.

15. The computer device as defined in claim 14, wherein the camera coordination application is further operable to:
   identify an object of interest in the field of view of the selected camera;
   convert to map scale, wherein the object of interest is defined by a set of coordinates; and
   generate the area data object such that the two-dimensional areal of interest covers the set of coordinates of the object of interest.

16. The computer device as defined in claim 12, wherein the camera coordination application is further operable to consider an elevation parameter of the target camera to determine a subset of target cameras of the set of cameras.

17. The computer device as defined in claim 16, wherein the camera coordination application is further operable to consider elevation parameters of buildings and walls that can affect the field of view of one or more cameras of the set of cameras to determine a subset of target cameras of the set of cameras.

18. The computer device as defined in claim 12, wherein the camera coordination application is further operable to compute a first outer edge of the field of view of the camera of the one or more target cameras that intersects with the two-dimensional area of interest at the broadest angle defined from the central axis of the field of view of the camera of the one or more target cameras.

19. The computer device as defined in claim 18, wherein the camera coordination application is further operable to, with the field of view object centered with respect to the centroid, calculate the zoom factor:
   compute a position of a first outer edge of a field of view object that contacts the two-dimensional area of interest based on the dimension information of the two-dimensional area of interest and the position parameters of the two-dimensional area of interest;
   compute a position of a second outer edge of the field of view object that contacts the two-dimensional area of interest based on the dimension information of the two-dimensional area of interest and the position parameters of the two-dimensional area of interest;

determine the narrowest field of view angle from the position of the first outer edge and the position of the second outer edge; and calculate the zoom factor from the narrowest field of view angle.

20. The computing device as defined in claim 19, wherein the camera coordination application is further operable to compute the position of the first outer edge by performing a two-dimensional rotation of the first outer edge of the field of view object at a maximum field of view angle of the target camera in a first direction and identifying the position of the first outer edge of the field of view object when the first outer edge contacts the two-dimensional area of interest, and wherein the camera coordination application is further operable to compute the position of the second outer edge by performing a two-dimensional rotation of the second outer edge of the field of view object at a maximum field of view angle of the target camera in a second direction and identifying the position of the second outer edge of the field of view object when the second outer edge contacts the two-dimensional area of interest.

21. The computer device as defined in claim 20, wherein the camera coordination application is further operable to calculate the zoom factor of the target camera from a maximum distance of the target camera and a maximum field of view angle of the target camera.

22. The computer device as defined in claim 21, wherein the dimension parameters define a two-dimensional area of interest with a polygonal shape, wherein the first outer edge of the field of view object contacts at least a first corner of the two-dimensional area of interest, and wherein the second outer edge of the field of view object contacts at least a second corner of the two-dimensional area of interest.

23. A non-transitory computer-readable medium storing instructions executable by a computer device for controlling cameras from a set of two or more cameras in a geographical area, comprising:

at least one instruction for causing the computer device to receive an area data object defining the topographical area of interest comprising dimension parameters defining at least two dimensions of the topographical area of interest and position parameters defining a position for the topographical area of interest;

at least one instruction for causing the computer device to derive a centroid of the topographical area of interest from the area data object;

at least one instruction for causing the computer device to automatically determine, through an analysis of possible field of views for each camera of the set of cameras to define a zone of potential coverage for the each camera, a subset of target cameras from the set of cameras, wherein the zone of potential coverage of each camera of the subset of the target cameras comprises the entire topographical area of interest;

at least one instruction for causing the computer device to compute pan and tilt angles for one or more target cameras of the subset of target cameras such that a field of view or the one or more target cameras of the subset of target cameras is centered with respect to the centroid;

at least one instruction for causing the computer device to compute for one or more target cameras of the subset of target cameras a zoom factor, the zoom factor calculated by determining a narrowest field of view angle of the target camera that encompasses the entire topographical area of interest as determined from the area data object; and at least one instruction for causing the computer device to generate transmission commands for the subset of target cameras based on the computed zoom factor and the computed pan and tilt angles.

* * * * *